United States Patent
Liao et al.

(10) Patent No.: US 10,477,632 B2
(45) Date of Patent: Nov. 12, 2019

(54) INDICATOR CIRCUIT AND APPARATUS USING THE SAME

(71) Applicant: INTERDIGITAL CE PATENT HOLDINGS, Paris (FR)

(72) Inventors: Zhijun Liao, Beijing (CN); Chao Zeng, Beijing (CN); Ren Zhang, Beijing (CN)

(73) Assignee: INTERDIGITAL CE PATENT HOLDINGS, Paris (FR)

(*) Notice: Subject to any disclaimer, the term of this patent is extended or adjusted under 35 U.S.C. 154(b) by 18 days.

(21) Appl. No.: 15/534,823

(22) PCT Filed: Dec. 10, 2014

(86) PCT No.: PCT/CN2014/093476
§ 371 (c)(1),
(2) Date: Jun. 9, 2017

(87) PCT Pub. No.: WO2016/090573
PCT Pub. Date: Jun. 16, 2016

(65) Prior Publication Data
US 2017/0347416 A1    Nov. 30, 2017

(51) Int. Cl.
*H02J 1/00* (2006.01)
*H05B 33/08* (2006.01)

(52) U.S. Cl.
CPC ........... *H05B 33/0815* (2013.01); *H02J 1/00* (2013.01); *H05B 33/0812* (2013.01); *Y02B 20/343* (2013.01)

(58) Field of Classification Search
CPC ........... H05B 33/0812; H05B 33/0815; Y02B 20/343; H02J 1/00
See application file for complete search history.

(56) References Cited

U.S. PATENT DOCUMENTS

| 5,944,830 A | 8/1999 | Hong et al. |
| 2005/0183500 A1* | 8/2005 | Kanouda .............. G01F 1/6842 73/202.5 |

(Continued)

FOREIGN PATENT DOCUMENTS

| CN | 2831648 | 10/2006 |
| CN | 1997101 | 7/2007 |

(Continued)

OTHER PUBLICATIONS

Wong, "Beginning Embedded Electronics—1", SparkFun Electronics, http://www.sparkfun.com/tutorials/57, Jun. 19, 2008, pp. 1-31.

(Continued)

*Primary Examiner* — Jared Fureman
*Assistant Examiner* — Duc M Pham
(74) *Attorney, Agent, or Firm* — Jeffrey M. Navon (57) ABSTRACT

An indicator circuit (10) includes a first light emission device (R1 and D1) configured to be driven by a first voltage (Von) to emit light; a second light emission device (R2 and D2) configured to be driven by a second voltage (Vstb) to emit light; and a control device (Q1, D3 and R3) configured to be driven by the first voltage (Von) and the second voltage (Vstb) to allow the first light emission device (R1 and D1) to be driven when the first voltage (Von) is active but the second voltage (Vstb) is not active and not to allow the first light emission device (R1 and D1) to be driven when the first voltage (Von) and the second voltage (Vstb) are active.

8 Claims, 7 Drawing Sheets

(56) References Cited

U.S. PATENT DOCUMENTS

| | | | |
|---|---|---|---|
| 2013/0264945 A1 | 10/2013 | Smith et al. | |
| 2014/0159909 A1* | 6/2014 | Liu | H01R 13/6683 340/660 |
| 2014/0285351 A1* | 9/2014 | Zhang | G01R 15/09 340/691.1 |
| 2015/0035450 A1* | 2/2015 | Werner | H05B 33/0851 315/291 |

FOREIGN PATENT DOCUMENTS

| | | |
|---|---|---|
| CN | 101409965 | 4/2009 |
| CN | 201277998 | 7/2009 |
| CN | 201444715 U | 4/2010 |
| CN | 201577224 | 9/2010 |
| CN | 201781660 | 3/2011 |
| JP | 6133551 | 5/1994 |
| JP | H0723307 | 1/1995 |

OTHER PUBLICATIONS

Sadler, "Audio Stereo Amplifer Project & Notes", http://southerncape.co.za/recreation/electronics/audio_stereo_amplifier.php, Jul. 15, 2010, pp. 1-3.

Storr, "PNP Transistor Analysis", http://www.electronics-tutorials.ws/blog/pnp-transistor-analysis.html, Jun. 24, 2009, pp. 1-3.

Anonymous, "Transistor Tutorial", http://www.mayothi.com/transistors.html/, Jan. 1, 2010, pp. 1-3.

\* cited by examiner

INDICATOR CIRCUIT AND APPARATUS USING THE SAME

This application claims the benefit, under 35 U.S.C. § 365 of International Application PCT/CN2014/093476, filed Dec. 10, 2014, which was published in accordance with PCT Article 21(2) on Jun. 16, 2016, in English.

TECHNICAL FIELD

The present invention generally relates to an indicator circuit and an apparatus using the same.

BACKGROUND ART

There is an apparatus such as a so-called "set-top box", for example, having at least two modes, i.e., a power-on mode and a standby mode. In the power-on mode, for example, all the power supply circuits included in the apparatus are alive. In the standby mode, for example, only one or some of the power supply circuits in the apparatus are alive for the purpose of saving energy consumption. In order to indicate to a user whether the apparatus is in the power-on mode or the standby mode, the apparatus may have mode indicators made of light emitting elements such as Light-Emitting Diodes (LED).

Such mode indicators can be controlled by, for example, General Purpose Input Output (GPIO) pins of a CPU. However, for this purpose, one set of GPIO pins of a CPU are used. Also, for controlling mode indicators, a CPU needs to have GPIO pins that are active even in a standby mode or an extra Micro Control Unit (MCU) that is active even in a standby mode.

SUMMARY

According to one aspect of the present disclosure, an indicator circuit includes a first light emission device configured to be driven by a first voltage to emit light; a second light emission device configured to be driven by a second voltage to emit light; and a control device configured to be driven by the first voltage and the second voltage to allow the first light emission device to be driven when the first voltage is active but the second voltage is not active and not to allow the first light emission device to be driven when the first voltage and the second voltage are active.

Other objects, features and advantages of the present disclosure will become more apparent from the following detailed description when read in conjunction with the accompanying drawings.

DESCRIPTION OF EMBODIMENTS

If it is possible to omit a preparation of GPIO pins or an extra MCU for controlling mode indicators in such an apparatus having different modes such as a power-on mode and a standby mode mentioned above and having the mode indicators indicating these modes of the apparatus, it is possible to improve the degree of freedom for design in the apparatus.

The embodiments of the present disclosure have been devised in consideration of such a situation and an object of the embodiments is to provide an indicator circuit for controlling mode indicators or such in an apparatus having different modes such as a power-on mode and a standby mode mentioned above and having the mode indicators or such indicating these modes, and such an apparatus using the indicator circuit.

Actual example of how to use an indicator circuit according to any one of the first and second embodiments of the present disclosure will be described later using FIG. 7.

Using FIGS. 1-3, the indicator circuit in the first embodiment will be described now.

Figure 1:
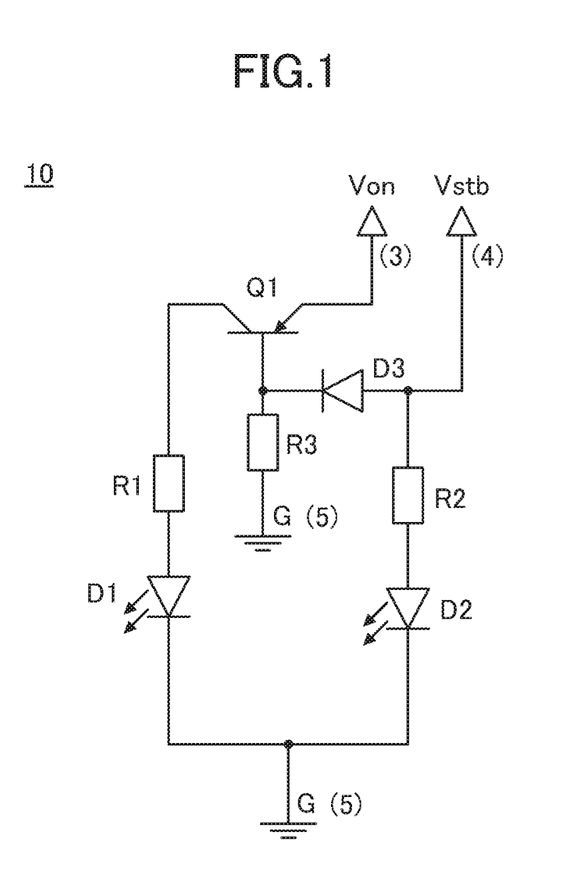
FIG. 1 is a circuit diagram illustrating an indicator circuit in a first embodiment.

FIG. 1 is a circuit diagram illustrating the indicator circuit in the first embodiment.

As shown in FIG. 1, the indicator circuit 10 in the first embodiment includes a light emitting element D1 that is a LED in the example of FIG. 1 and a light emitting element D2 that is also a LED in the example of FIG. 1. The cathodes of both the LEDs D1 and D2 are connected to a ground terminal 5 having a ground voltage G. A current limiting resistance element R1 is connected with the LED D1 in series. Similarly, a current limiting resistance element R2 is connected with the LED D2 in series. The current limiting resistance elements R1 and R2 can be used to adjust the luminance of the LEDs D1 and D2 and avoid over current statuses which may otherwise occur in the LEDs D1 and D2. For convenience of explanation, the series circuit including the LED D1 and the resistance element R1 may be referred to as a "first light emission device". Similarly, a series circuit including the LED D2 and the resistance element R2 may be referred to as a "second light emission device".

The indicator circuit 10 further includes a switching element Q1 that is a PNP transistor (hereinafter, simply referred to as a "transistor Q1") in the example of FIG. 1. The emitter of the transistor Q1 is connected with a first power supply terminal 3; the collector of the transistor Q1 is connected with one end of the current limiting resistance element R1, the other end of which is connected with the anode of the LED D1; and the base of the transistor Q1 is connected with one end of a resistance element R3, the other end of which is connected with the ground terminal 5. The cathode of a directional element D3 that is a diode (hereinafter, simply referred to as a "diode D3") in this example of FIG. 1 is also connected with the base of the transistor Q1, and the anode of the diode D3 is connected with a second power supply terminal 4. Also one end of the current limiting resistance element R2 is connected with the anode of the diode D3, and the other end of the current limiting resistance element R2 is connected with the anode of the LED D2. Here, it is assumed that the diode D3 is configured to be turned on when a voltage applied to the anode is greater than or equal to a voltage applied to the cathode. For convenience of explanation, a circuit including the transistor Q1, the resistance element R3 and the diode D3 may be referred to as a "control device".

Operations of the indicator circuit 10 will now be described using FIGS. 2-3.

The indicator circuit 10 can be used in an apparatus such as a so-called "set-top box", for example, having at least two modes, i.e., a power-on mode and a standby mode. A "set-top box" is an example merely for an exemplification purpose. There are many apparatuses having at least two modes, i.e., a power-on mode and a standby mode, and the embodiments of the present disclosure can be applied to any one thereof. In the power-on mode (i.e., a normal mode), for example, all the power supply circuits included in the apparatus are alive. In the standby mode, for example, only one or some of the power supply circuits in the apparatus are alive for the purpose of saving energy consumption. In order to indicate to a user whether the apparatus is in the power-on mode or the standby mode, the indicator circuit 10 can be used.

Specifically, the first power supply terminal 3 of the indicator circuit 10 is connected with one of the power supply circuits in the apparatus which is alive in the power-on mode and also is alive in the standby mode. The second power supply terminal 4 of the indicator circuit 10 is connected with another of the power supply circuits in the apparatus which is alive in the power-on mode but is not alive in the standby mode. Note that the first embodiment of FIGS. 1-3 assumes that the power supply circuit with which the second power supply terminal 4 is connected has a voltage Vstb greater than or equal to a voltage Von at the power supply circuit to which the first power supply terminal 3 is connected. As a result, in the power-on mode, the first power supply terminal 3 is alive, while the second power supply terminal 4 is alive and has the voltage Vstb greater than or equal to the voltage Von at the first power supply terminal 3. In contrast thereto, in the standby mode, the first power supply terminal 3 is alive but the second power supply terminal 4 is not alive.

Then, when the apparatus is in the power-on mode (i.e., a normal mode), both the first and second power supply terminals 3 and 4 are alive, and the second power supply terminal 4 has the voltage Vstb greater than or equal to the voltage Von at the first power supply terminal 3. As mentioned above, it is assumed that the diode D3 is configured to be turned on when a voltage applied to the anode is greater than or equal to a voltage applied to the cathode. As a result, in the power-on mode, the diode D3 is turned on and the voltage Vstb at the second power supply terminal reaches the base of the transistor Q1 through the diode D3, while the voltage Von at the first power supply terminal 3 is applied to the emitter of the transistor Q1. Since the voltage Vstb at the second power supply terminal 4 is greater than or equal to the voltage Von at the first power supply terminal 3, the voltage greater than or equal to the voltage applied to the emitter is applied to the base, and thus, the transistor Q1 is turned off. Since the transistor Q1 is thus turned off, no current flows through the series circuit including the transistor Q1, the current limiting resistance element R1 and the LED D1. As a result, the LED D1 is turned off.

Figure 2:
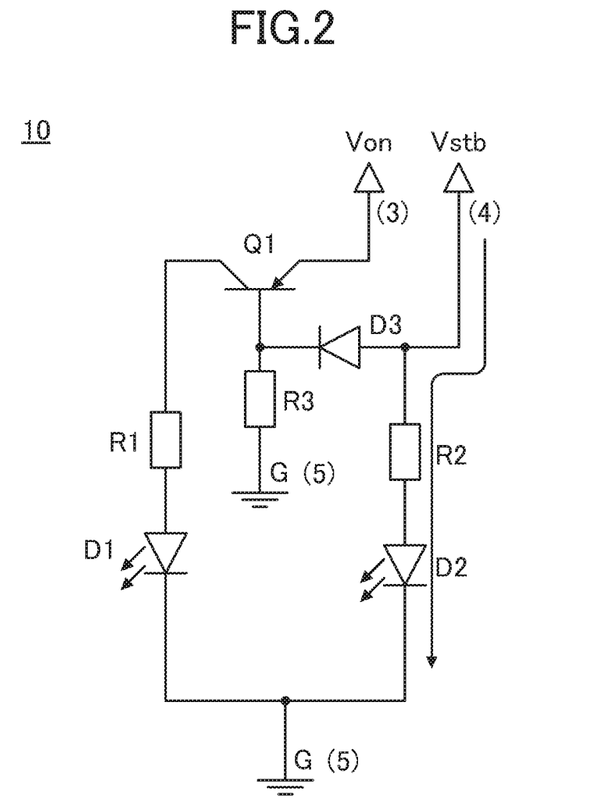
FIG. 2 is a circuit diagram for illustrating operations of the indicator circuit shown in FIG. 1.
Figure 3:
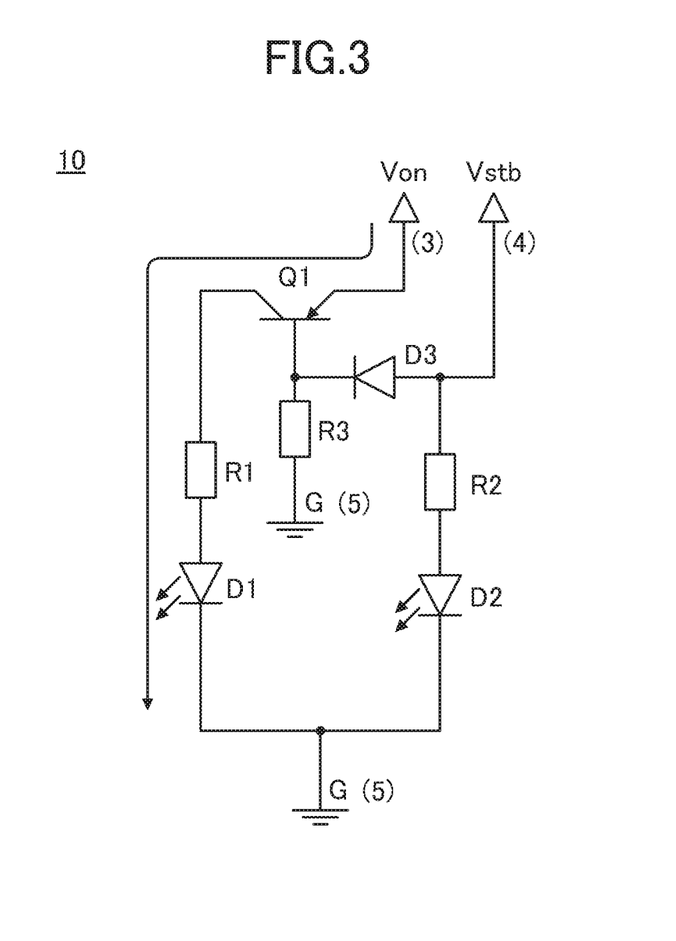
FIG. 3 is a circuit diagrams for illustrating operations of the indicator circuit shown in FIG. 1.

In contrast thereto, since the voltage Vstb at the second power supply terminal 4 is applied to the series circuit including current limiting resistance element R2 and the LED D2, a current flows therethrough as indicated by an arrow shown in FIG. 2 from the second power supply terminal 4 to the ground terminal 5, and the LED D3 is turned on.

Thus, in the power-on mode (or a normal mode), the LED D2 is turned on while the LED D1 is turned off. Therefore, for example, by using the LED D2 configured to emit red light, a user can easily know that the apparatus is in the power-on mode as a result of the LED D2 emitting red light.

Next, when the apparatus is in the standby mode, only the first power supply terminal 3 is alive and the second power supply terminal 4 is not alive. Since no current flows from the cathode to the anode in the diode D3 due to the nature of a diode as a directional element in the state where the second power supply terminal 3 is not alive in the standby mode, no current flows through the series circuit including the current limiting resistance element R2 and the LED D2. As a result, the LED D2 is turned off.

In contrast thereto, since the first power supply terminal 3 is alive while the second power supply terminal 4 is not alive in the standby mode, the voltage applied to the emitter of the transistor Q1 is greater than the voltage applied to the base which is connected to the ground terminal 5 via the resistance element R3. As a result, the transistor Q1 is turned on. Thus, a current flows through the series circuit including the transistor Q1, the current limiting resistance element R1 and the LED D1 as indicated by an arrow shown in FIG. 3. Thus, the LED D1 is turned on.

Thus, in the standby mode, the LED D1 is turned on while the LED D2 is turned off. Therefore, for example, by using the LED D1 configured to emit green light, a user can easily know that the apparatus is in the standby as a result of the LED D1 emitting green light.

Figure 5:
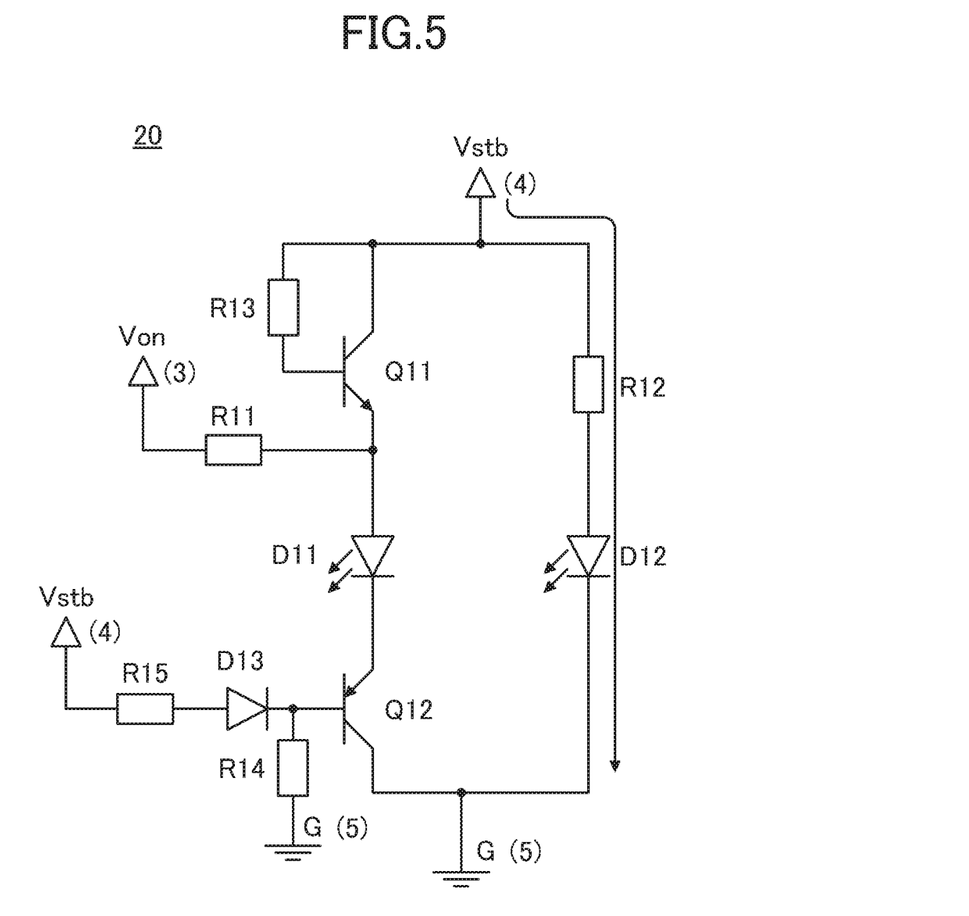
FIG. 5 is a circuit diagrams for illustrating operations of the indicator circuit shown in FIG. 4.
Figure 6:
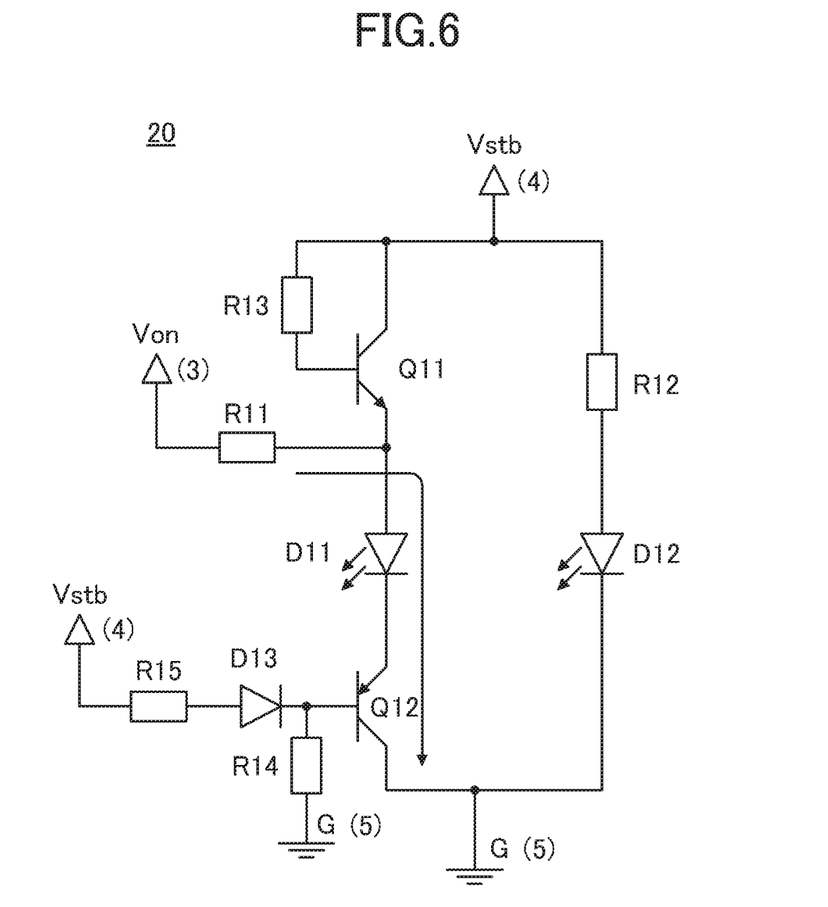
FIG. 6 is a circuit diagrams for illustrating operations of the indicator circuit shown in FIG. 4.

Next, the indicator circuit in the second embodiment of the present disclosure will be described using FIGS. 4-6.

The above-described indicator circuit 10 in the first embodiment assumes that, as mentioned above, the voltage Vstb is greater than or equal to the voltage Von. However, an apparatus in which such an indicator circuit is applied may have no power supply circuits that meet the requirement. In other words, as mentioned above, the first power supply terminal 3 of the indicator circuit 10 is connected with one of the power supply circuits in the apparatus which is alive in the power-on mode and also is alive in the standby mode. The second power supply terminal 4 of the indicator circuit 10 is connected with another of the power supply circuits in the apparatus which is alive in the power-on mode but is not alive in the standby mode. In this case, there may be a case where the apparatus does not include two types of power supply circuits, the first one of which is alive in both the power-on mode and the standby mode and the second one of which is alive only in the power-on mode and has the voltage greater than or equal to the voltage of the first one.

The second embodiment can be applied to such an apparatus that does not include two types of power supply circuits, the first one of which is alive in both the power-on mode and the standby mode and the second one of which is alive only in the power-on mode and has the voltage greater than or equal to the voltage of the first one, but includes two types of power supply circuits, the first one of which is alive in both the power-on mode and the standby mode and the second one of which is alive only in the power-on mode and has the voltage less than or equal to the voltage of the first one.

Figure 4:
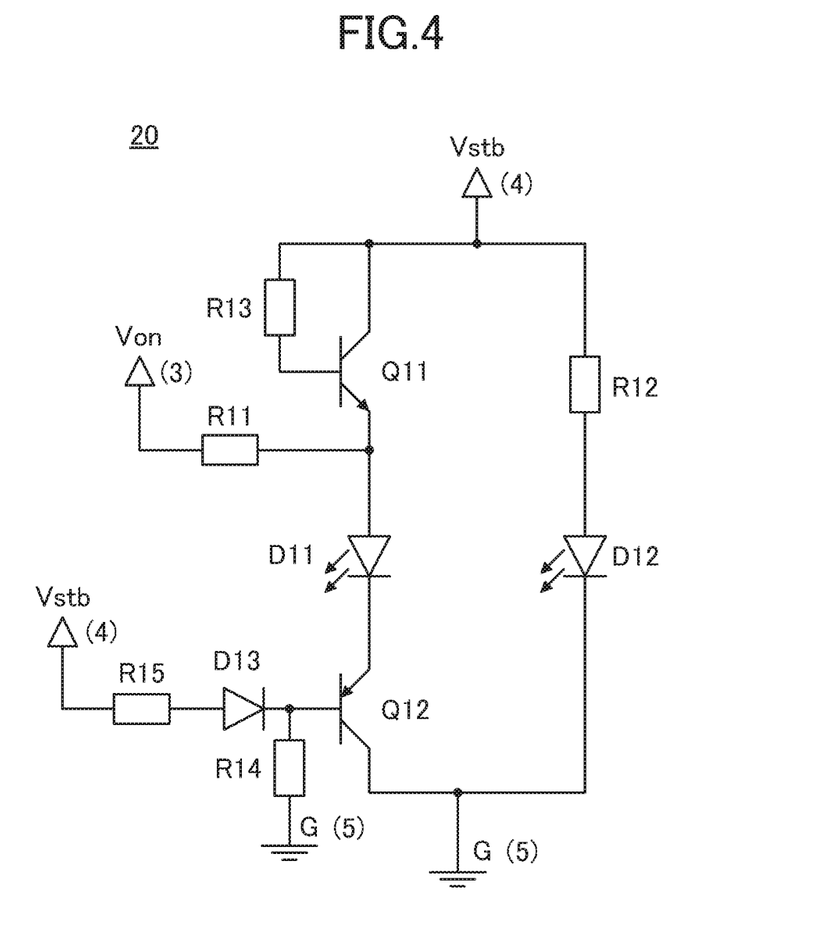
FIG. 4 is a circuit diagram illustrating an indicator circuit in a second embodiment.

As shown in FIG. 4, the indicator circuit 20 in the second embodiment includes a light emitting element D11 that is a LED in the example of FIG. 4 and a light emitting element D12 that is also a LED in the example of FIG. 4. The anode of the LED D11 is connected with a switching element Q11 that is a NPN transistor (hereinafter, simply referred to as a "transistor Q11") in the example of FIG. 4. The cathode of the LED D11 is connected with a switching element Q12 that is a PNP transistor (hereinafter, simply referred to as a "transistor Q12") in the example of FIG. 4. The cathode of the LED D12 is connected to a ground terminal 5 having a ground voltage G. A current limiting resistance element R11 is connected with the LED D11 in series. Similarly, a current limiting resistance element R12 is connected with the LED D12 in series. The current limiting resistance elements R11 and R12 can be used to adjust the luminance of the LEDs D11 and D12 and avoid over current statuses which may otherwise occur in the LEDs D11 and D12. For convenience of explanation, the series circuit including the LED D11 and the current limiting resistance element R11 may be referred to as a "first light emission device". As shown in FIG. 4, the current limiting resistance element R11 is connected between a first power supply terminal 3 and the anode of the LED D11. A series circuit including the LED D12 and the resistance element R12 may be referred to as a "second light emission device" and the series circuit is connected between a second power supply terminal 4 and the ground terminal 5.

The emitter of the transistor Q11 is connected with the anode of the LED D11; the collector is connected with the second power supply terminal 4; and the base is connected with one end of a resistance element R13, the other end of which is connected to the second power supply terminal 4. For convenience of explanation, the parallel circuit including the transistor Q11 and the resistance element R13 may be referred to as a "first switching device".

The emitter of the transistor Q12 is connected with the cathode of the LED D11; the collector is connected with the ground terminal 5; and the base is connected with one end of a directional element D13 that is a diode (hereinafter, simply referred to as a "diode D13") in the example of FIG. 4, the other end of which is connected to the second power supply terminal 4 via a resistance element R15. Also, the base of the transistor Q12 is connected to the ground terminal 5 via a resistance element R14. For convenience of explanation, the circuit including the transistor Q12, the diode D13 and the resistance elements R14 and R15 may be referred to as a "second switching device".

Operations of the indicator circuit 20 in the second embodiment will now be described using FIGS. 5-6.

Also the indicator circuit 20 can be used in an apparatus such as a so-called "set-top box", for example, having at least two modes, i.e., a power-on mode and a standby mode. As mentioned above, there are many apparatuses having at least two modes, i.e., a power-on mode and a standby mode, and the embodiments of the present disclosure can be applied to any one thereof. In the power-on mode (i.e., a normal mode), for example, all the power supply circuits included in the apparatus are alive. In the standby mode, for example, only one or some of the power supply circuits in the apparatus are alive for the purpose of saving energy consumption. In order to indicate to a user whether the apparatus is in the power-on mode or the standby mode, the indicator circuit 20 can be used.

Specifically, the first power supply terminal 3 of the indicator circuit 20 is connected with one of the power supply circuits in the apparatus which is alive in the power-on mode and also is alive in the standby mode. The second power supply terminal 4 of the indicator circuit 20 is connected with another of the power supply circuits in the apparatus which is alive in the power-on mode but is not alive in the standby mode. As a result, in the power-on mode, the first power supply terminal 3 is alive, and also the second power supply terminal 4 is alive. In contrast thereto, in the standby mode, the first power supply terminal 3 is alive but the second power supply terminal 4 is not alive.

Then, when the apparatus is in the power-on mode (i.e., a normal mode), both the first and second power supply terminals 3 and 4 are alive and have voltages Von and Vstb, respectively. As a result, a current flows through the series circuit of the current limiting resistance R12 and the LED D12 as indicated by an arrow shown in FIG. 5, and thus, the LED D12 is turned on. Also the transistor Q11 is turned on since a current flows to the base of the transistor Q11 from the second power supply terminal 4 through the resistance element R13. As a result of the transistor Q11 being thus turned on, the voltage at the emitter of the transistor Q11 is almost the same as the voltage Vstb of the second power supply terminal 4. Since the voltage at the emitter of the transistor Q11 is dropped through the LED D11, the voltage at the emitter of the transistor Q12 is less than the voltage Vstb. Also, the resistance element R15 and the diode D13 are selected so that, even due to the voltage drop through the resistance element R15 and the diode D13 from the voltage Vstb, the voltage at the base of the transistor Q12 is greater than the voltage at the emitter. As a result, the transistor Q12 is turned off, therefore no current flows through the series circuit of the LED D11 and the transistor Q12 and thus, the LED D11 is turned off. The resistance element R15 functions to limit a current flowing to the base of the transistor Q12.

Thus, in the power-on mode (or a normal mode), the LED D12 is turned on while the LED D11 is turned off. Therefore, for example, by using the LED D12 configured to emit red light, a user can easily know that the apparatus is in the power-on mode as a result the LED D12 emitting red light.

Next, when the apparatus is in the standby, only the first power supply terminal 3 is alive and the second power supply terminal 4 is not alive. As a result, no current flows through the series circuit including the current limiting resistance element R12 and the LED D12, and thus, the LED D12 is turned off. Also the transistor Q11 is turned off since the second power supply terminal 4 is not alive. On the other hand, the voltage at the emitter of the transistor Q12 is applied by the first power supply terminal 3 via the resistance element R11 and the LED D11. Also, since the second power supply terminal 4 is not alive, no voltage is applied to the base of the transistor Q12 from the second power supply terminal 4 through the resistance element R5 and the diode D13. The voltage at the base of the transistor Q12 is then lowered by as a result of being connected to the ground terminal 5 via the resistance element R14. As a result, a current flows out from the base of the transistor Q12 through the resistance element R14, and thus, the transistor Q12 is turned on, therefore a current flows through the series circuit of the resistance element R11, the LED D11 and the transistor Q12, as indicated by an arrow shown in FIG. 6, and thus, the LED D11 is turned on. The diode D13 functions to prevent a high voltage from being applied to the second power supply terminal 4 and also to prevent the second power supply terminal 4 from being at the ground voltage G.

Thus, in the standby mode, the LED D11 is turned on while the LED D12 is turned off. Therefore, for example, by using the LED D11 configured to emit green light, a user can easily know that the apparatus is in the standby as a result the LED D11 emitting green light.

The inventors experimented with the above-described indicator circuits according to the first and second embodiments. The manufactures' names and the product numbers of the respective circuit elements used in the experimentations are shown in the table below.

|  | Manufacturer | Product Number |
|---|---|---|
| LEDs | LITE-ON TECHNOLOGY CORPORATION | LTST-C190KRKT-TH |
| Transistors (PNP) | NXP SEMICONDUCTORS NETHERLANDS BV | PMBT2907A |
| Transistor (NPN) | NXP SEMICONDUCTORS NETHERLANDS BV | PMBT3904 |
| Resistors | PROSPERITY DIELECTRICS CO. LTD. | FCF02J* serial |
| Diodes | DIODES, INC. | BAS40-*-F |

Next, using FIG. 7, how to apply the above-described indicator circuit 10 or 20 in an apparatus will be described.

Figure 7:
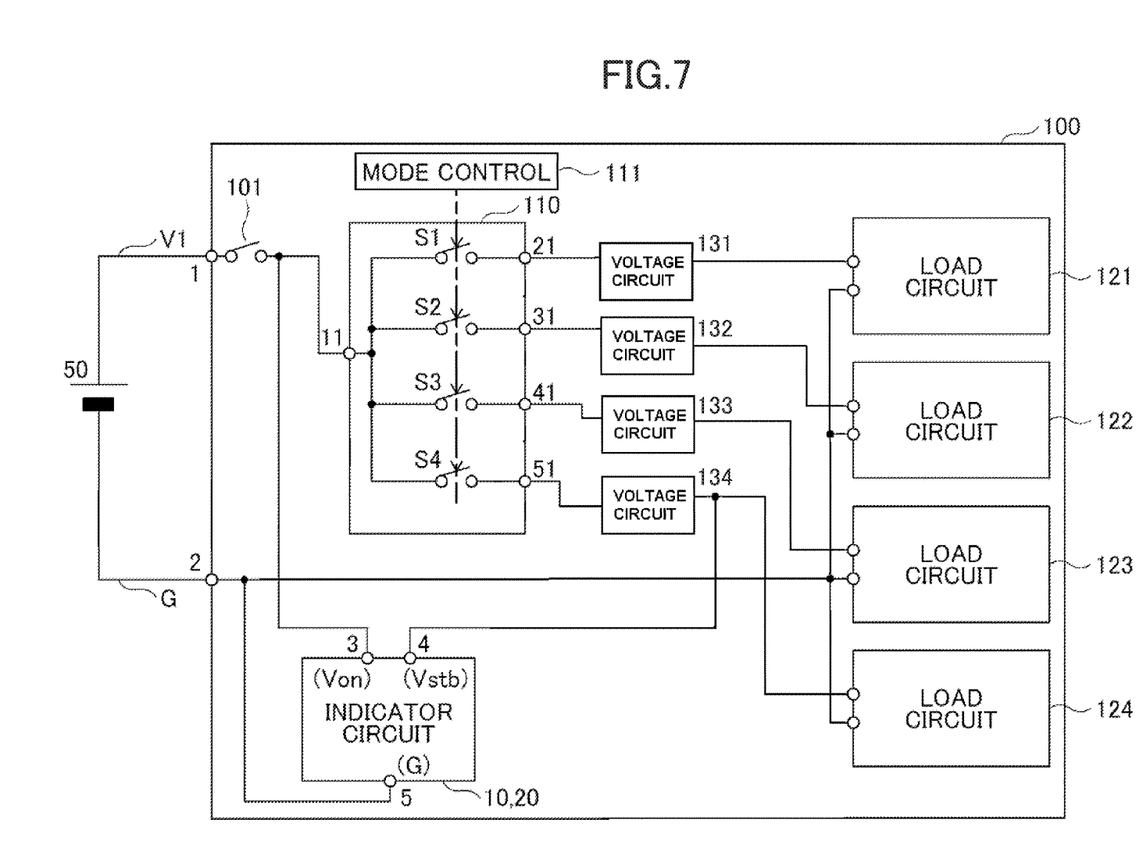
FIG. 7 is a circuit diagram illustrating an apparatus according to a third embodiment using an indicator circuit that can be the indicator circuit of FIG. 1 or the indicator circuit of FIG. 4.

FIG. 7 illustrates an apparatus 100 according to the third embodiment of the present disclosure such as a set-top box.

As shown in FIG. 7, the apparatus 100 includes a power distribution circuit 110 for distributing DC power supplied by a DC power source 50 via an input terminal 11, which provides a power supply voltage V1 via a power supply terminal 1, to load circuits 121-124 via output terminals 21, 31, 41 and 51, through voltage circuits 131-134, respectively. The power distribution circuit 110 includes switching units S1-S4 corresponding to the load circuits 121-124, respectively, for controlling whether to supply the power to the load circuits 121-124, respectively. A power supply switch 101 connected between the terminals 1 and 11 is used to turn on/off the apparatus 100.

The voltage circuits 131-134 are circuits for adjusting the power supply voltage V1 to those suitable for the respective load circuits 121-124. For example, the voltage circuits 131-134 include respective voltage step-down circuits to reduce the power supply voltage V1. Note that the apparatus 100 can be an apparatus that does not include such voltage circuits 131-134. In this regard, when the indicator circuit 10 in the first embodiment is applied to the apparatus 100, since the first embodiment assumes that the voltage Vstb is greater than or equal to the voltage Von, the voltage circuit 134 supplying the voltage Vstb as shown in FIG. 7 does not include such a voltage step-down circuit to meet the assumption.

The apparatus 100 further includes a mode control circuit 111 controlling the respective switching units S1-S4. For example, in the power-on mode, the mode control circuit 111 controls the switching units S1-S4 so as to turn on all the switching units S1-S4 to supply the power to all the load circuits 121-124. In contrast thereto, in the standby mode, the mode control circuit 111 controls the switching units S1-S4 so as to turn on, for example, only the switching unit S1 and turn off the other switching units S2-S4 to supply the power only to the load circuit 121 so as to save power consumption.

In this case, as shown in FIG. 7, the first power supply terminal 3 of the indicator circuit 10 or 20 is connected to the power supply line between the power supply switch 101 and the terminal 11, the second power supply terminal 4 of the indicator circuit 10 or 20 is connected to the power supply line between the switching unit S4 and the terminal 51, and the ground terminal 5 is connected to the ground line between the terminal 2 and the load circuits 121-124. As a result, in the power-on mode (or a normal mode), the power supply voltage V1 is applied to the first power supply terminal 3 through the power supply switch 101 while the power supply voltage processed by the voltage circuit 134 is applied to the second power supply terminal 4. In this case, since both of the first and second power supply terminals 3 and 4 are thus alive, the LED D2 or D12 indicating the power-on mode emits light (for example, red light) while the LED D1 or D11 indicating the standby mode does not emit light. In contrast thereto, in the standby mode, the power supply voltage V1 is applied to the first power supply terminal 3 through the power supply switch 101 but no power supply voltage is applied to the second power supply terminal 4 since the switching unit S4 is turned off in the standby mode as mentioned above. In this case, since the first power supply terminal 3 is alive but the second power supply terminal 4 is not alive, the LED D1 or D11 indicating the standby mode emits light (for example, green light) while the LED D2 or D12 indicating the power-on mode does not emit light. Thus, the user can easily and positively know which mode the apparatus is in, by the simple circuit as shown in FIGS. 1-3 or FIGS. 4-6.

Note that the apparatus 100 may include a rectifying circuit for acquiring DC power from AC power such that the apparatus 100 can operate by AC power.

Further, the circuit configuration of the apparatus 100 shown in FIG. 7 is only one example, and such apparatuses to which the indicator circuit 10 or 20 according to the embodiment is applied can have any other various circuit configurations. Also, in an apparatus such as the apparatus 100 to which the indicator circuit 10 or 20 according to the embodiment is applied, the actual circuit points to which the first and second power supply terminals 3 and 4 of the indicator circuit 10 or 20 are connected can be any other points as long as power supply voltages are applied to the first and second power supply terminals 3 and 4 in the power-on mode and a power supply voltage is applied only to the power supply terminal 3 in the standby mode as mentioned above. Also, it is preferable that the actual voltages applied to the first and second power supply terminals 3 and 4 are those suitable for the light emitting elements D1 and D2 or D11 and D12 (i.e., LEDs in the above-described embodiments). Further, as mentioned above, when the indicator circuit 10 in the first embodiment is applied to the apparatus 100, since the first embodiment assumes that the voltage Vstb is greater than or equal to the voltage Von, respective voltages supplied to the first and second power supply terminals 3 and 4 meet the assumption.

Thus, the indicator circuits and the apparatuses using the same have been described by the specific embodiments. However, the present disclosure is not limited to these embodiments, and variations and replacements can be made within the scope of the claimed disclosure.

The invention claimed is:

1. An indicator circuit comprising:
a first light emission device configured to be driven by a first voltage to emit light;
a second light emission device configured to be driven by a second voltage to emit light; and
a control device configured to be driven by the first voltage and the second voltage to allow the first light emission device to be driven when the first voltage is active but the second voltage is not active and not to allow the first light emission device to be driven when the first voltage and the second voltage are active,
wherein the control device is configured to allow a current to flow from a terminal to which the second voltage is applied to the first light emission device but prevent a current from flowing out from the first light emission device when the first voltage and the second voltage are active, and
wherein the control device is configured to allow a current coming from a terminal to which the first voltage is applied to flow through and out from the first light emission device when the first voltage is active but the second voltage is not active.

2. The indicator circuit as claimed in claim 1, wherein the control device is configured to allow the first voltage to drive the first light emission device when the first voltage is active but the second voltage is not active and not to allow the first voltage to drive the first light emission device when the first voltage and the second voltage are active.

3. The indicator circuit as claimed in claim 2, wherein the control device includes:
a switching element configured to pass the first voltage therethrough when the first voltage is active but the second voltage is not active and not to pass the first voltage therethrough when the first voltage and the second voltage are active;
a directional element configured to prevent a current from flowing therethrough to the second light emission device when the first voltage is active but the second voltage is not active and allow a current flowing therethrough to the switching element when the first voltage and the second voltage is active; and
a resistance element configured to determine a voltage at a control electrode of the switching element when the second voltage is not active.

4. The indicator circuit as claimed in claim 1, wherein the control device is configured to have a first switching device that includes a first switching element configured to pass a current therethrough between the terminal at which the second voltage is applied and the first light emission device and a second switching device that includes a second switching element configured not to pass a current therethrough to prevent the current from flowing out from the first light emission device, when the first voltage and the second voltage are active, and
wherein the first switching element is configured not to pass a current therethrough between the terminal to which the second voltage is applied and the first light emission device but the second switching element is configured to allow a current coming from the terminal to which the first voltage is applied to flow through and out from the first light emission device, when the first voltage is active but the second voltage is not active.

5. The indicator circuit as claimed in claim 4, wherein the first switching device further includes a resistance element configured to determine a voltage applied to a control electrode of the first switching element when the second voltage is active, and
wherein the second switching device further includes a directional element configured to allow a current to flow from the terminal to which the second voltage is applied to a control electrode of the second switching element and a resistance element to determine a voltage applied to the control electrode of the second switching element when the second voltage is not active.

6. The indicator circuit as claimed in claim 1, wherein the first light emission device includes a light emitting element, and the second light emission device includes another light emitting element.

7. An apparatus comprising:
a power distribution circuit configured to receive DC power and include a plurality of switching units to distribute the DC power to respective load circuits; and
the indicator circuit claimed in claim 1,
wherein the indicator circuit is configured to indicate a first mode where the DC power is supplied to the power distribution circuit and one of the switching units is turned on and a second mode where the DC power is supplied to the power distribution circuit and the one of the switching units is turned off, and
wherein the indicator circuit is configured to be driven by the first voltage of the DC power supplied to the power source distribution circuit and the second voltage of the DC power supplied from the one of the switching units.

8. A method of driving a first light emission device driven by a first voltage and a second light emission device driven by a second voltage, comprising:
allowing the first light emission device to be driven to emit light when the first voltage is active but the second voltage is not active;
not allowing the first light emission device to be driven when the first voltage and the second voltage are active,
allowing a current to flow from a terminal to which the second voltage is applied to the first light emission device but prevent a current from flowing out from the first light emission device when the first voltage and the second voltage are active, and
allowing a current coming from a terminal to which the first voltage is applied to flow through and out from the first light emission device when the first voltage is active but the second voltage is not active.

* * * * *